United States Patent [19]

Buescher

[11] 4,334,618

[45] Jun. 15, 1982

[54] STATIONERY HAVING SNAP-OPEN ENVELOPE WITH REMAILABLE PORTION

[75] Inventor: Eugene J. Buescher, Lake St. Louis, Mo.

[73] Assignee: William R. O'Meara, Florrisant, Mo.

[21] Appl. No.: 76,604

[22] Filed: Sep. 18, 1979

Related U.S. Application Data

[60] Division of Ser. No. 872,467, Jan. 26, 1978, Pat. No. 4,190,162, which is a continuation of Ser. No. 480,621, Jun. 19, 1974, abandoned.

[51] Int. Cl.³ .............................................. B65D 27/06
[52] U.S. Cl. ....................................... 206/623; 229/73
[58] Field of Search .......................... 229/69, 73, 92.1; 206/623, 610

[56] References Cited

U.S. PATENT DOCUMENTS

| | | | |
|---|---|---|---|
| 1,142,349 | 6/1915 | Merrill | 206/610 |
| 1,803,348 | 5/1931 | Pasurka | 206/610 |
| 2,931,559 | 4/1960 | Hilliard | 229/73 |
| 3,379,363 | 4/1968 | Sutphen, Jr. | 206/449 |
| 3,411,699 | 11/1968 | Pine et al. | 229/69 |

Primary Examiner—Stephen P. Garbe

[57] ABSTRACT

Stationery including a snap-open envelope having perforations arranged so that an end portion separates from the remaining portion to expose the contents. The remaining portion provides a return or reusable envelope having an end closure flap which, when the return envelope is closed, may cover a portion of the front panel of the original envelope, with a portion of the original back panel of the original envelope becoming the front panel of the return envelope. The snap-open envelope can be of the pasted type having front and back panels die cut or perforated from different paper sheets with the panels pasted together to form the envelope and with an insert or information sheet between the panels. This envelope can be processed by high speed data processing equipment including computer driven printing.

16 Claims, 37 Drawing Figures

STATIONERY HAVING SNAP-OPEN ENVELOPE WITH REMAILABLE PORTION

This application is a division of copending U.S. application Ser. No. 872,467, filed Jan. 26, 1978, now U.S. Pat. No. 4,190,162, which is a continuation of U.S. application Ser. No. 480,621 filed June 19, 1974, now abandoned.

BACKGROUND OF THE INVENTION

This invention relates to stationery and more particularly to stationery having a snap-open envelope a portion of which provides a reusable envelope.

Envelopes are commonly used one time and discarded. For example, in billing and other business mail, it is common practice to provide a separate, self-addressed return envelope inside the billing envelope. The use of two separate envelopes compared to a reusable or two-way envelope, of course, results in increased manufacturing costs and handling. Also since additional material is required, there is an increase in waste, and in waste handling costs, as well as natural resources, and these are undesirable from an ecological point of view.

Envelopes that can be snapped open are desirable because of the ease with which they are opened. In the case of advertising material, for example, such easy opening envelopes encourage the receiver to open them.

Snap-open reusable envelopes have been proposed but have had certain drawbacks. For example, some were provided with address windows which required the proper orientation of the return message in the return envelope in order that the proper address appear in the window for return mailing. Improper orientation could result in unmailable matter. The window type of envelope also limited the types of contents that could be used. Also, additional enclosures, such as a remittance, could cover the address. Where confidential information is used there is a chance that it could be seen through the window. Also, window envelopes are generally limited to industrial use, and require that the address be printed on the insert instead of directly on the envelope. It has also been proposed to use, instead of a window, a sticker for attachment over the original address, however, this results in increased manufacturing costs and handling.

Some snap-open envelopes provided a reusable envelope having an end closure flap that was a portion of the front panel of the original envelope. With such a construction, mailing instructions could not be placed on the inside of the end closure flap that would be seen by the receiver upon opening if the envelope was opened while looking at the front face thereof. Also, the reusable envelope portion was generally greatly reduced in size from the original envelope since it was usually desired to completely remove the original mailing address. These were of the address window type.

U.S. Pat. No. 3,558,041, issued to the present applicant discloses a snap-open envelope but does not provide an envelope having a reusable envelope portion. U.S. Pat. Nos. 3,062,431 and 3,747,837 relate to envelopes that can be snapped open or separated on perforation lines and which provide a portion for use as an envelope but these are of the address window type. U.S. Pat. No. 3,227,360 has an envelope with a portion for reuse but is also of the address window type.

SUMMARY OF THE INVENTION

It is therefore an object of the present invention to provide stationery having a snap-open envelope with a portion which provides a reusable envelope that substantially avoids the above-mentioned undesirable features.

It is another object of the invention to provide a snap-open envelope in which the opposed ends are pulled apart to provide a portion which serves as an envelope and which has an end closure flap wherein instructions for use or notification that the one portion does serve as an envelope, can be applied to the flap and readily seen upon opening the original envelope.

Another object is to provide a snap-open envelope that can be constructed to provide, upon opening, a remailable envelope which is a relatively large portion of the original envelope, and which has an end enclosure flap.

Another object is to provide a snap-open envelope which can be printed with the sender's and receiver's address and a portion of which provides a reusable envelope wherein the receiver's name can be delated if desired, and which permits the use of the original sender's address to be used to return the reusable envelope to the original sender.

Another object is to provide novel stationery that includes a snap-open envelope that provides a reusable envelope and which can be processed by a computer driven printer.

Still another object is to provide stationery which includes a data computer processed envelope formed of pasted together panels which is opened by a snap action and which provides a reusable envelope.

In accordance with one aspect of the present invention stationery is provided which includes an envelope formed with perforations on the front and back sides which separate the envelope into two portions upon the opening of the envelope, the front side being adapted to have address means thereon. One of the portions has an end flap which can be used to close it so that it can contain an element to be mailed. In accordance with another aspect of the invention stationery is provided which includes an envelope front panel and an envelope back panel which are perforated and adhesively connected back together to provide a snap-open envelope having a reusable portion with an end flap, the panels having facing margins adhesively connected together.

These and other objects and advantages of the invention will be apparent from the following detailed description and drawings, wherein like reference numerals refer to like parts.

BRIEF DESCRIPTION OF THE DRAWINGS

FIG. 27 shows a completed envelope including a front panel and the panels of FIGS. 25 and 26;

DESCRIPTION OF THE PREFERRED EMBODIMENTS

Figure 1:
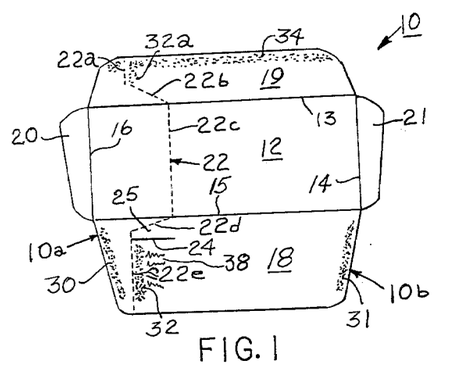
FIG. 1 is a plan view of a pre-cut sheet of paper capable of being formed into an envelope in accordance with one embodiment of the present invention.
Figure 2:
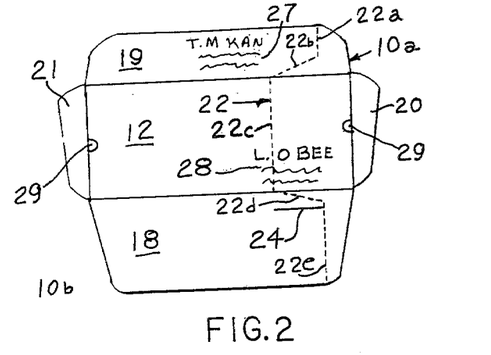
FIG. 2 is a plan view of the reverse side of the pre-cut sheet of FIG. 1.

Referring now to the drawings, a pre-cut sheet of paper is shown in FIGS. 1 and 2 which provides a single piece envelope form 10 having a front panel 12 defined by four fold lines 13, 14, 15 and 16, a back panel 18, an upper main sealing panel or closure flap 19, and end flaps 20 and 21. FIG. 1 shows the side which will become the interior side in the finished envelope while FIG. 2 shows the side which will become the exterior side of the finished envelope.

A continuous tear line, shown as a perforation line 22, extends downwardly from the upper edge of flap 19, to the bottom edge of back panel 18. Perforation line 22, as viewed in FIG. 1, includes a relatively small vertical portion 22a extending inwardly from the upper edge of flap 19 to the middle where it connects with a straight line portion 22b that is inclined rightwardly and connects with a vertical line portion 22c at about the fold line 13. The perforation line portion 22c extends vertically downwardly to the fold line 15 where it connects with a line portion 22d that is inclined leftwardly and downwardly. Perforation line portion 22d connects with a vertical portion 22e that extends vertically to the bottom edge of back panel 18.

The perforation line 22 divides blank 10 into a relatively small portion 10a that includes minor portions of panels 12, 18, and 19, and the end flap 20, and a major portion 10b which includes major portions of panels 12, 18 and 19, and end flap 21.

Where desired, a small slit or cut 24 may be provided which extends horizontally or longitudivally from the perforation line 22e on panel 18 at a point slightly below (e.g. ⅛ inch) the junction of portions 22d and 22e, inwardly to a point directly below perforation line 22c. As will be discussed more fully hereinafter, slit 24 provides a tab 25 which may be used to provide postage, a meter number, or information for returning the reusable portion back to the sender.

As seen in FIG. 2, the exterior side of form 10 is preprinted with the original sender's return name and address 27 printed on flap 19 longitudinally about midway of the flap. The original receiver's name and address 28 is shown printed on the front panel 12 to the right of the geometric center of the blank with the perforation line 22c extending through the name and address 28. Both addresses 27 and 28 are printed so that they are both readable as viewed in FIG. 2.

A pair of semi-circles 29 are printed at the opposite ends of the front panel 12 along the longitudinal axis of the panel. One semi-circle may have printed therein "hold" while the other has "snap" or "pull" printed therein.

The blank 10 is provided with an adhesive or glue on the interior side of the back panel 18 along the opposite ends such as indicated at 30 and 31 in FIG. 1. These glue areas 30 and 31 are located so that during manufacture, when the blank 10 is folded into and envelope 10', as shown in FIG. 3, the glue will secure the back panel 18 only to the exterior sides of the folded-in end flaps 20 and 21.

As seen in FIG. 1, additional vertically extending glue stripes 32 and 32a are disposed on the main blank portion 10b spaced from but adjacent the perforation lines 22a and 22e, respectively. The glue lines are used to seal the reusable portion of the envelope, as will be apparent hereinafter.

Figure 3:
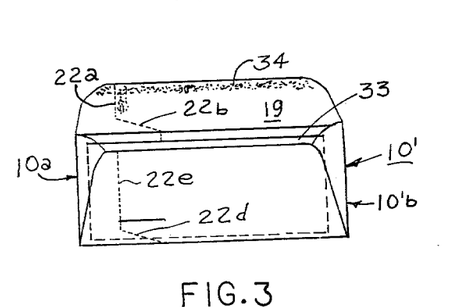
FIG. 3 is a plan view of the back side of an envelope formed from the sheet of FIG. 1 with an enclosure therein but with the flap up.
Figure 4:
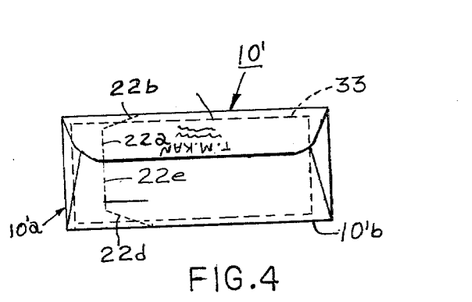
FIG. 4 is a plan view of the back side of the envelope of FIG. 3 after it is closed.
Figure 5:
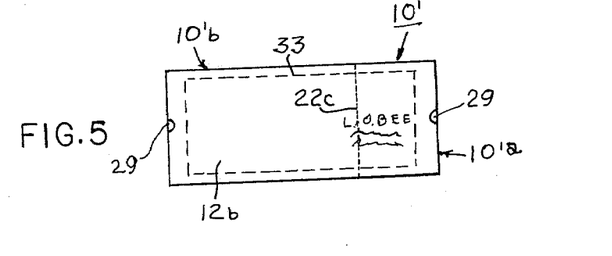
FIG. 5 is a plan view of the front side of the envelope of FIG. 4.

In FIG. 3, the envelope 10' is shown open with an enclosure 33 disposed therein. The upper flap 19 is provided with adhesive or glue indicated at 34 for sealing the envelope closed. The glue 34 is shown extending longitudinally but spaced a short distance on either side of the perforation line 22a. In FIGS. 4 and 5, the envelope is shown closed and containing enclosure 33 to provide stationery ready for mailing. The perforation line 22 divides the envelope 10' into a relatively small portion 10'a and a relatively large portion 10'b which consist of blank portions 10a and 10b, respectively.

Figure 6:
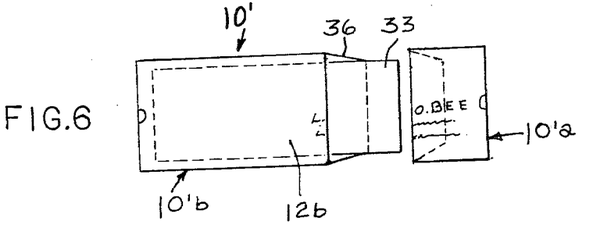
FIG. 6 is a plan view of the envelope of FIG. 5 after it has been snapped open.

When the stationery has been received by the receiver, the opposite ends of the envelope 10' are grasped at the semi-circles 29 and the envelope is snapped open as indicated in FIG. 6. The enclosure 33 is shown remaining in the main envelope portion 10'b while the minor portion 10'a has been separated therefrom along the perforation line 22 which is continuous about the envelope 10'. The minor portion 10'a is discarded and the contents 33 removed from the open major portion 10'b which latter portion now serves as a reusable or re-mailable envelope as seen in FIGS. 7, 8 and 9.

Figure 7:
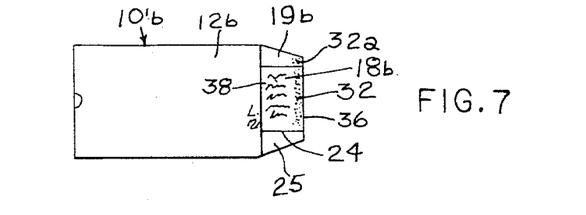
FIG. 7 is a plan view of the left hand portion of the envelope of FIG. 6 which serves as a return envelope.

It will be apparent, especially from FIGS. 4 and 5, that since the perforation lines 22a and 22e, which are shown forming together a vertical straight line (FIG. 4) on the back side of the envelope are offset longitudinally toward one end of the envelope from the perforation line 22c on the front side (FIG. 5), an end sealing flap 36 is provided in the reusable envelope as shown in FIG. 7. Flap 36 includes a portion 18b of the original back panel, and a portion 19b of the original sealing flap 19. Flap 36 has the glue stripes 32 and 32a thereon so that after a return message, such as indicated at 37 in FIGS. 8 and 9, has been inserted, the glue is wetted and folded over onto the portion 12b which is a portion of the original front panel 12 as seen in FIG. 8. In the illustrated embodiment, a right hand portion of the original receiver's name and address was removed during the snap opening of the original envelope since it was on the minor portion 10'a which is discarded. Also, the flap 36, when folded over the portion 12b (FIG. 8) cover or hides the remaining left hand portion of the original receiver's name and address.

Figure 8:
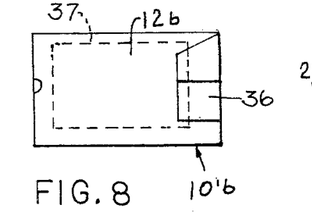
FIG. 8 is a plan view of the return envelope of FIG. 7 with a return enclosure therein and the envelope closed.

The front panel portion 12b of the original envelope 10', as is seen in FIG. 5 now becomes a portion of the rear or back side of the return or reusable envelope 10'b as is seen in FIGS. 7 and 8. This back side also includes the flap 36 which includes portions of the original back side of the original envelope including portions of the back panel 18 and flap 19.

Figure 9:
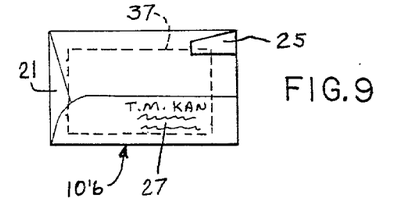
FIG. 9 is a plan view of the envelope of FIG. 8 showing the reverse side thereof.

FIG. 9 shows the front side of the reusable envelope 10'b with the pre-printed address 27 which was originally the return address on the original envelope. The front side includes portions of the original backpanel 18, flap 19, and end flap 21 of blank 10 (FIG. 1).

The tab 25 is folded in the reverse direction from that of the end sealing flap 36 so that it covers a portion of the front of the reusable envelope 10'b as seen in FIG. 9. The tab 25 may be provided with glue for wetting and have postage thereon. For example, it may be provided with a postage stamp or where permitted, with a return permit number so that the original sender can pay the return postage. The glue used for tab 25 is preferrably a conventional non-drying adhesive provided with a pealable cover (not shown).

Referring again to FIG. 7, information or directions for using the reusable or return envelope may be pre-printed on the flap as indicated at 38.

Figure 10:
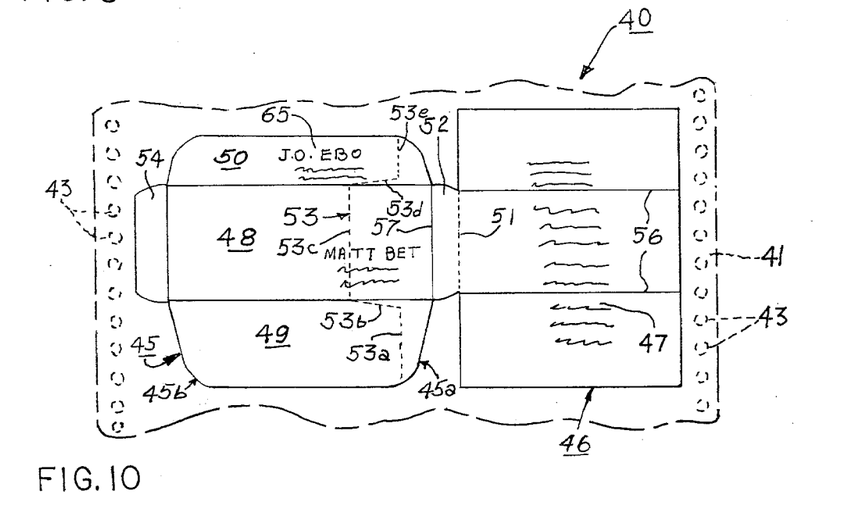
FIG. 10 is a plan of paper stock or a form cut to provide stationery including an envelope in accordance with another embodiment of the invention.

FIG. 10 illustrates a modified embodiment which shows an envelope and message blank 40 die cut or otherwise formed from a sheet 41, shown in phantom and having sheet advancing holes 43 along the opposed sides of the sheet for cooperation with drive gears (not shown). Blank 40 maybe die cut as the sheet 41 is advanced through a die (not shown). Blank 40 includes an envelope blank 45 integrally formed with a letter sheet 46 on which a message indicated at 47, is printed. The sheet 46 is attached to blank 45 by a tear or perforation line 51.

Figure 11:
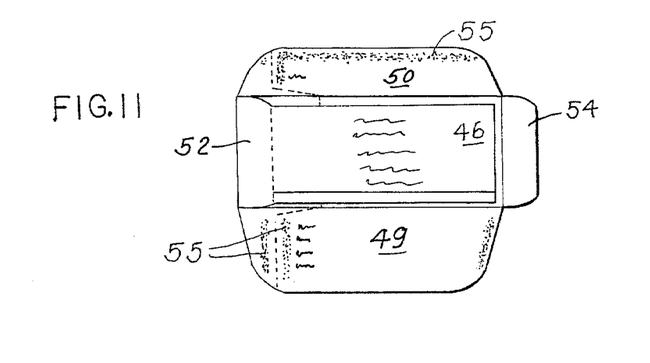
FIG. 11 is a plan view of the stationery form of FIG. 10 folded.

The envelope blank 45 is similar to blank 10 of FIGS. 1 and 2 except that it is not shown with a slit 24 as in FIG. 1. Blank 45 includes a front panel 48, back panel 49, sealing flap 50, and end flaps 52 and 54. A performation line 53, similar to line 22 of FIG. 1, includes a portion 53a which extends vertically adjacent the right end of the envelope to an angularly inwardly and upwardly extending portion 53b. Portion 53b connects with a vertically extending perforation portion 53c extending vertically across the front panel 48. A portion 53d extends angularly from portion 53c to a vertical portion 53e. The perforation portions 53a and 53e being offset to the right of portion 53c on the front panel. The perforation line 53 divides the blank 45 into a portion 45a and a portion 45b. The message sheet 46 is connected to the end flap 52 by the perforation line 51 which defines the right end edge of flap 52. Glue is applied to blank 45 in the same manner as it was applied to the blank 10 of FIG. 1, as seen in FIG. 11 where the interior side of the form 45 is shown. As seen in FIG. 11, glue or adhesive is indicated at 55. It is shown on the back panel 49 and flap panel 50.

Figure 12:
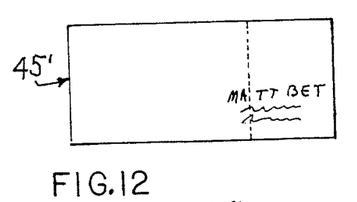
FIG. 12 is a plan view of stationery formed by completing the folding and sealing of the stationery form of FIG. 11.

In FIG. 11, the message blank 46 is shown folded on the fold lines shown in FIG. 10 at 56 and then the folded blank is folded laterally on the flap fold line indicated at 57 in FIG. 10. Then the envelope blank 45 is folded and sealed to provide an envelope 45' with the letter 46 therein as seen in FIG. 12.

Figure 13:
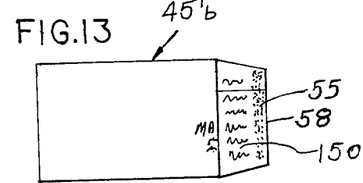
FIG. 13 is a plan view of a reusable portion of the envelope of FIG. 12 after it has been opened.
Figure 14:
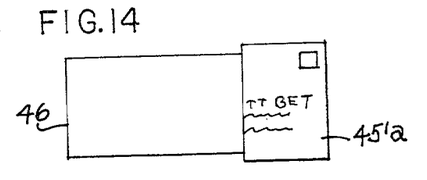
FIG. 14 is a plan view of the contents and an end portion of the envelope of FIG. 12 after it has been opened.

When the stationery is opened by snap-opening the envelope, that is, by pulling the right and left ends apart, a reusable envelope 45'b having a pre-glued closure end flap 58 is provided, as seen in FIG. 13. As seen in FIG. 14, the message 46 is removed from the envelope along with the minor portion 45'a to which it is attached by the perforation line 51. The letter 46 and portion 45'a are readily separated by pulling them apart.

Figure 15:
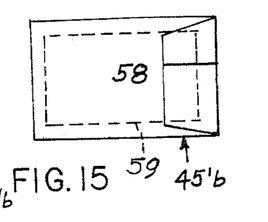
FIG. 15 is a plan view of one side of the reusable envelope portion shown in FIG. 13 but closed for remailing.
Figure 16:
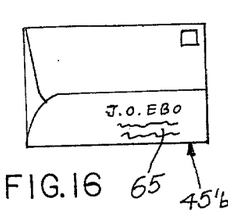
FIG. 16 is a plan view of the envelope of FIG. 15 but showing the reverse side.

A return message at 59 in FIG. 15 is inserted into the reusable or return envelope 45'b and the pre-glued flap 58 wetted and folded over onto that side that was the front side of the original letter but which now becomes the back side of the return envelope 45'b. In FIG. 16, the front side of the return envelope containing the message is shown with a stamp and ready for remailing. The return address of the original envelope 45' as indicated generally at 65 in FIG. 10, now becomes the mailing address for the return envelope 45'b in FIG. 16. Thus, it is not necessary for the person returning a message to write the name and address of the person or company to which it is being returned.

Figure 17:
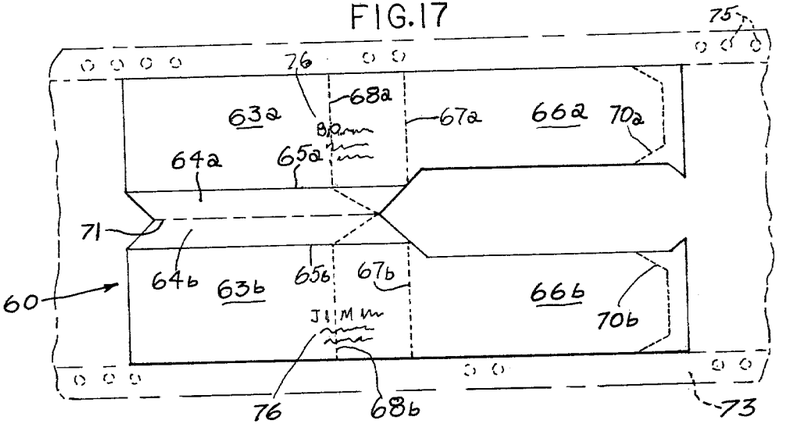
FIG. 17 is a plan view of a flat sheet paper form having cut envelope front and back panels therein for use in forming envelopes in accordance with still another embodiment of the present invention.
Figure 18:
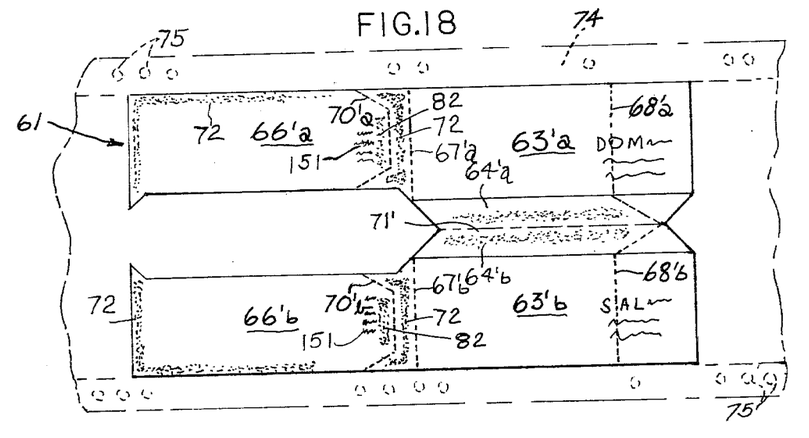
FIG. 18 is a plan view of a flat sheet paper form used with the form shown in FIG. 17 for producing envelopes.

In FIGS. 17 and 18, similar envelope forms 60 and 61 are illustrated which can be superposed and pasted together to provide a plurality of envelopes in accordance with another embodiment of the invention. One such envelope is indicated at 62 in FIGS. 19 and 20.

Form 60 includes a pair of front panels 63a and 63b having closure flaps 64a and 64b respectively, integrally connected at fold lines 65a and 65b. The form 60 also includes back panels 66a and 66b shown connected by perforation lines 67a and 67b to front panels 63a and 63b, respectively. Front panel 63a is provided with a perforation line 68a extending from the upper edge vertically downwardly across the height of the panel and then angularly across the flap 64a to the bottom right corner of the flap. Similarly, a perforation line 68b extends from the bottom edge vertically across the front panel 63b and then angularly to the upper right corner of flap 64b.

Back panel 66a is provided with a perforation line 70a extending from the lower edge to the upper edge a minor or relatively short distance from the right end of the back panel. Perforation line 70a includes a central portion and portions at each end thereof which are inclined inwardly toward the right end of the panel. Back panel 66b is provided with a perforation line 70b similar to perforation line 70a.

The form 61 of FIG. 18 is identical to form 60 of FIG. 17 but is, in effect, rotated 180° about it's vertical axis with respect to form 60. Thus, like corresponding panels and perforation lines of form 61 are identified by like corresponding reference characters except that the characters of form 61 are primed.

As seen in the drawings perforation lines 68a, 68'a, 68b and 68'b devide their respective front panels and closure flaps into major and minor portions; and the perforation lines 70a, 70'a, 70b and 70'b divide the back panels into major and minor portions. The perforation lines 67a, 67b, 67'a, and 67'b are used during the manufacture of the envelopes to separate the front and back panels from each other in each form.

The back panels 66a, 66'a, 66b and 66'b may be provided with an adhesive or paste as indicated at 72. The paste is shown extending vertically along the end margins and horizontally partly along the margins of the outer longer sides of the back panels leaving a marginal portion free of paste so that a superposed minor portion of a front panel will not be glued to a major portion of a back panel of a constructed envelope so that the envelope can be snapped open. The paste 72 is disposed on the interior side of each back panel so that it is shown only in FIG. 18 where the interior sides are seen.

The envelope forms 60 and 61 may be obtained by die cutting and slitting a sheet shown in phantom at 73 and 73' from a supply roll of paper stock. Opposed sides of the sheets are provided with sheet advancing holes 75 for cooperation with drive gears for moving the sheet through a die cutter, printer, slitter, paste applying device, etc. The flaps are separated by slitting along lines 71 and 71'.

The forms 60 and 61 may be printed and addressed by computer operated printers. Also, where desired, a third sheet having suitably die cut printed letters or information inserts may be positioned between the forms 60 and 61 and suitably glued between opposed front and back panels to produce an envelope with an insert, such as indicated at 77 in FIG. 20. The flap, which is also provided with an adhesive, FIG. 18, for sealing the envelope, may then be wetted and closed.

Additional mailing matter or inserts may be included before the closure flap is sealed to the back panel of the envelope. Various methods of producing the envelope 62 and variations in the sequence of steps mentioned above are possible, as will be apparent to those skilled in the art.

After the forms 60 and 61 are suitably addressed, such as with a receiver's name and address 76 and a return name and address 78 (FIG. 19) the forms are glued together by paste 72 and then separated on perforation lines 67a, 67b, 67'a and 67'b to form four envelopes. The envelope 62 is indicated as being formed by front panel 63b of FIG. 17 and back panel 66'b of FIG. 18.

Figures 19, 20, 21, 22, 23, 24, 25, 26, 34, 35, 36, 37:
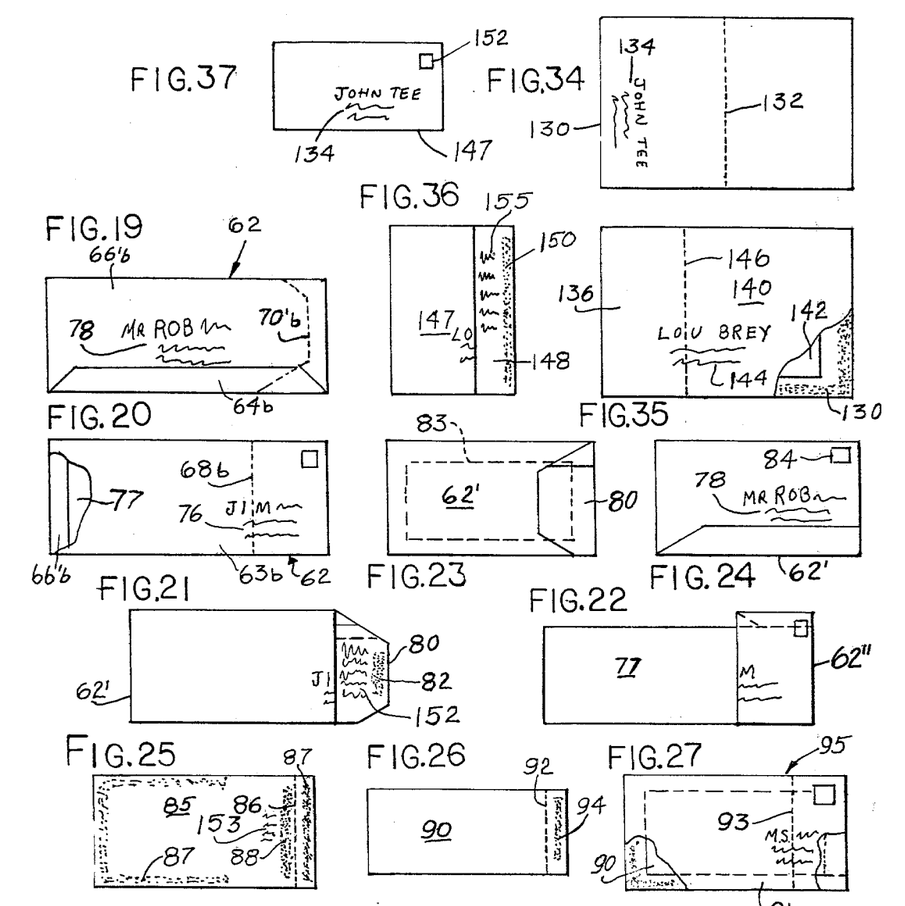
FIG. 19 is a plan view of a completed envelope formed from the panels of FIGS. 17 and 18 and showing the back side thereof.
FIG. 20 is a plan view, with portions broken away, of the completed envelope of FIG. 19 but showing the front side thereof.
FIG. 21 is a plan view of a reusable portion of the envelope of FIG. 20.
FIG. 22 is a plan view of the right end portion of the envelope and enclosure of the stationery of FIG. 20.
FIG. 23 is a plan view of the envelope portion of FIG. 21 but in a closed condition and containing another enclosure to be mailed.
FIG. 24 is a plan view of the envelope of FIG. 23 but showing the reverse side thereof.
FIG. 25 is a plan view of a back panel of another modified embodiment of the present invention.
FIG. 26 is a plan view of an insert or information panel to be associated with the back panel of FIG. 25.
FIG. 34 is a plan view of a back panel for use in forming an envelope according to another embodiment.
FIG. 35 is a plan view, partly broken, of a completed envelope using the panel of FIG. 34.
FIG. 36 is an open reusable portion of the envelope of FIG. 35.
FIG. 37 is the reusable portion of FIG. 36 closed for use.

The envelope 62 is snapped open by grasping the opposite sides or ends and forcing the envelope to separate along the perforation lines 68b and 70'b into a return or reusable portion 62' as seen in FIG. 21 and a minor portion 62" as seen in FIG. 22. The minor envelope portion 62" of FIG. 22 includes the minor portions of the front panel 63b and flap 64b, which are to right of perforation line 68b in FIG. 17, and the minor portion of the back panel 66'b to the right of perforation line 70'b in FIG. 18. The remailable portion 62' in FIG. 21 includes the remaining major portions of the front panel 63b, closure flap 64b, and the back panel 66'b. Since the portion of perforation line 68b, as seen also in FIG. 20 is offset farther from the right side or end of the envelope than the perforation line 70'b (FIG. 19), a closure flap 80 is formed which includes portions of the original back panel 66'b and closure flap 64b. Flap 80 extends rightwardly beyond the right end of the portion of the original front panel and is shown provided with an adhesive 82 shown also in FIG. and 18. After a return insert or information sheet or card is inserted into envelope 62' in FIG. 21, the end closure flap 80 may be wetted and folded over onto the major portion of the original front panel 63b as seen in FIG. 23. The return insert is indicated at 83 in phantom and may be a portion of the original insert 77 if desired. While the back or rear side of the return envelope 62' is shown in FIG. 23, the front side is shown in FIG. 24. A stamp 84 is shown on the front side along with the original sender's name and address 78 which may be preprinted on the forms 61, in FIG. 18 and oriented to be positioned to become the mailing name and address of the remailable envelope 62', as seen in FIG. 24.

A rectangular back panel 85 is shown in FIG. 25 which has a vertical perforation line 86 adjacent to the right side thereof. It is also provided with an adhesive 87 along the four margins and a vertical line 88 of adhesive to the left of the perforation line 86.

An insert sheet or letter shown in FIG. 26 at 90 is adapted to be positioned between the back panel 85 and a rectangular front panel 91 as in FIG. 27. The insert 90 has a vertical perforation line 92 spaced from the right side or end a distance equal to the distance that perforation line 86 of the back panel is positioned away from the right side thereof. The insert 90 is placed on back panel 85 with the perforation lines 86 and 92 aligned with the right end of the insert adhering to the back panel by means of adhesive 87. Adhesive 87 also secures the front panel 91 to the back panel since adhesive stripe 94 on the insert holds the right end or side of front panel 91 to the insert.

As seen in FIG. 27, the front panel has a vertical perforation line extending from the bottom to the top of the panel which is offset from the right side thereof a greater distance than that between the perforation line 86 of both panel 85 and the right end thereof.

Figures 28, 29, 30, 31, 32, 33:
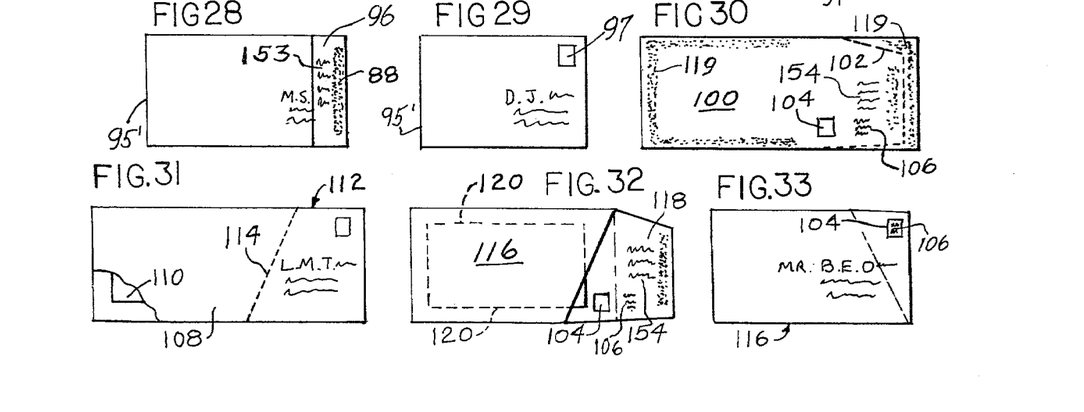
FIG. 28 shows the reusable portion of the envelope of FIG. 27 after it has been opened.
FIG. 29 shows the reusable portion of FIG. 28 closed and the reverse side of it.
FIG. 30 is a plan view of a back panel used in an envelope in accordance with still another embodiment of the present invention.
FIG. 31 is a plan view, partly broken away, of stationery using the panel of FIG. 30.
FIG. 32 is a plan view of the reusable portion of the envelope of FIG. 31 after it has been opened.
FIG. 33 is a plan view of the reverse side of the reusable envelope of of FIG. 32 but with it closed for mailing.

The perforation line of the front panel is indicated at 93. In this way, when the envelope, indicated generally at 95 in FIG. 27, is snapped open by pulling the opposed ends in opposite directions, an end closure flap 96 is provided as seen in FIG. 28, wherein the reusable or return envelope portion of the original envelope is indicated at 95'. The envelope separates on the perforation lines. The return envelope 95' includes the major portions of the front and back panels of the original envelope 95.

After an insert or return letter is inserted into envelope 95', adhesive 88 is wetted and the flap 96 folded over on the back side of the return envelope. The envelope is shown rotated in FIG. 29 and provided with a stamp 97. The underside of the back panel, or side opposite the side seen in FIG. 25 may be provided with a return address that become the address to which the reusable envelope is to be mailed, as seen in FIG. 29. Also, the front panel of the reusable envelope 95' is a portion of the back panel 85 of the original envelope 95.

In FIG. 30, a back panel 100 of another embodiment is shown rectangular in form and having a perforation line 102 extending from the bottom to the top of the panel adjacent to the right side thereof. The perforation line 102 has a vertical portion and a pair end portions which are inclined inwardly toward the right end or side of the panel. Also, a hole or window 104 is formed, such as by die cutting, near the bottom edge of the panel with instructions, postage, mailing permit number (if allowed by the Postal Service) to the right of the window 104 and indicated at 106, as will by discussed hereinafter. The data 106 may be "Permit No." or any desired element or lettering permitted.

A front panel 108 is shown adhesively connected to back panel 100 with an insert or letter 110 therebetween to form an envelope 112 as seen in FIG. 31. The front panel 108 is provided with a perforation line 114 extending from the bottom edge angularly upwardly and toward the right end of the panel.

When the envelope 112 is snapped open the front panel separates on perforation line 114 and the back panel on perforation line 102 to provide an envelope 116 having an end closure flap indicated at 118 in FIG. 32. The portions of the original front and back panels at the right end are discarded and a return insert or letter 120 is inserted in the envelope 116. The flap 118 is provided with an adhesive on the inside surface as seen also in FIG. 30, which is wetted, and then the flap is folded over on top of the remaining portion of the original front panel to close the reusable portion or envelope 116. When the envelope is turned over, as seen in FIG. 33, the postage or instruction 106 shows through window 104. Adhesive for this envelope is indicated generally at 119.

In FIG. 34 the outside of a rectangular back panel 130 is shown with the panel having a vertical perforation line 132 approximately mid-way between the opposed sides. Also, a return name and address 134 which is printed vertically along the left side or end of the panel.

A rectangular front panel 136 in FIG. 35 is adhesively secured to the inside of the back panel 130 to provide an envelope 140. An insert or letter 142 is shown disposed between the front and back panels. The front panel is also provided with a mailing name and address 144 which is shown extending laterally across a vertical perforation line 146. The perforation line 146 is disposed closer to the left side of envelope 140 than is the perforation line 132 on the back panel 130 so that when the envelope is snapped open, a reusable portion or envelope 147 is provided with a closure flap 148, as seen in FIG. 36.

The flap 148 is provided with an adhesive 150 which may be applied to the back panel 130 in FIG. 34. After a return letter is inserted into envelope 147 the adhesive 150 is wetted and the flap 148 is folded over to close the envelope. When the envelope is closed and rotated 180° about the longer or horizontal axis and then rotated 90° about an axis normal to the plane of the envelope, as is shown in FIG. 37, the address 134, (shown also in FIGS. 34) is readable and provides the mailing address for return envelope 147. Postage 152 may be applied in the conventional manner in the upper right corner. It will be apparent that the panels are sized so that the vertical dimension of the panels, as seen in FIGS. 34 and 35, become the width or horizontal dimension of the reusable envelope. The envelope of FIG. 35 is similar to that of FIG. 27.

In most of the illustrated embodiments the original mailing address on the front panel of the original envelope is partially removed when the envelope is snapped open or torn along the perforation lines, and the remaining portion of the address on the reusable or return portion is covered by the right closure flap. If desired, and where adequate space is available, the original mailing address may be located so that it is completely contained on the disposable right end portion of the original envelope, as in the case of the envelope shown in FIG. 31. In the latter case, the original mailing address is completely removed when the original envelope is snapped open.

Where adhesive is used to connect portions of the envelope together, it should of course be applied such that the portion of the front panel to the right of its perforation line does not adhere to the portion of the back side or back panel to the left of its perforation so that the portions of the envelope will separate easily on opening.

In some cases the closure flaps may be connected to the upper edge of the panel. In the envelope forms shown in FIGS. 17 and 18, the closure flaps 64a and 64'a are integrally connected to their associated front panels along the lower edges when facing the front panel with the mailing address readable.

In each of the illustrated embodiments, information or data means such as indicated at 38 in FIG. 7, and which may for example, be elements such as ink printing or the like or a sticker or other means, will be in view after the original envelope is opened. Such data means may advise the receiver that the left envelope portion can be reused or returned. In FIGS. 13, 18, 21, 28, 32 and 36 such information data is indicated at 150–155, respectively. Preferably, the left-to-right width of the flaps are at least one inch to provide sufficient space for this information.

In each of the embodiments illustrated the front panel of the original envelope extends continuously from the left edge to the right edge, that is, solid or without a mailing address window. The mailing and return address means may be ink printing or a sticker with printing thereon, or the like, and the printing, sticker or other element is shown disposed on the exterior surface of the panel. The address means may be a name of a person, a name and address, an address only, or any other indicia which indicates a desired destination. The postage means may be a printing of postage, or a permit number and associated information or the like.

As used herein, viewing or facing the front panel means facing the front panel so that when a normal or usual mailing address is on the front panel, it is readable. While the left envelope portion, when facing the front panel, is used as the reusable or return envelope in each of the illustrated embodiments, the right envelope portion in some cases may be used as the reusable envelope portion. For example, by locating the front panel line of perforations closer to the right edge or side of the envelope than the perforation line on the back side, a closure flap which is part of the back side, is provided. In such case, the right end portion of the original envelope can be closed and reused. Since it is generally desirable to discard the envelope portion with the postage, as in the illustrated embodiments, the above mentioned reuse of a right envelope portion may be desirable, for example, if the required or normal position of the postage is changed to the left side of the envelope. Also, where desired, the original mailing address may be disposed on the reusable or return envelope portion such that it remains in view and is not covered by the closure end flap. However, it is often desirable to remove the entire original mailing address to avoid ay possible confusion as to the actual mailing address for the reusable portion, or to avoid a part of the original address remaining.

In addition to the advantages of easy opening, savings in material, reduction in waste material, confidentiality, and other advantages, envelopes made in accordance with the present invention can be manufactured, and printed at relatively low cost.

It will now be apparent that the objects and advantages set out hereinbefore have been met. It is to be understood that the foregoing description and accompanying drawings have been given only by way of illustration and example, and that alterations and changes in the present disclosure, which will be readily apparent to one skilled in the art, are contemplated as within the scope of the present invention, which is limited only by the claims which follow.

What is claimed is:

1. A mailing envelope comprising three sheets superimposed in facing relation, two of said sheets being front and back outer sheets of the mailing envelope with said front sheet having mailing address means thereon for mailing the mailing envelope, return address means on one of said three sheets, the third of said sheets being disposed between said two outer sheets, two of said sheets each having a tear line of perforations extending between a pair of opposite sides of the mailing envelope, said tear lines of perforations dividing the last named two sheets into left and right envelope portions separable from each other at said tear lines of perforations upon applying a force tending to separate said envelope portions when opening the mailing envelope, one of said envelope portions, after the mailing envelope is opened, including a part of one of said outer sheets and a part of one of the other of said three sheets with one of said parts of said one envelope portion being longer than the other of said parts of said one envelope portion to provide an end closure flap foldable over said other part for closing said one envelope portion, said one and other parts of said one envelope portion defining a return envelope which is usable to contain and mail an element therein, said mailing and return address means being so located relative to said tear lines of perforations that said mailing address means is essentially eliminated as a mailing address for said return envelope and said return address becomes the mailing address for said return envelope.

2. A mailing envelope comprising front and back sides connected in facing relation and upper, lower, left and right edges, said front and back sides including front and back panels, respectively, mailing address means on the exterior side of said front panel for mailing said envelope, return address means on the exterior side of one of said panels, first and second tear lines of perforations extending substantially between the upper and lower edges of the envelope respectively on said front and back sides dividing the envelope into separable left and right envelope portions each including a part of said back side and a part of said front side, one of said lines of perforations being disposed closer to the left edge of the envelope than the other of said lines of perforations so that upon separation of said left and right envelope portions one of said parts of one of said envelope portions has a greater left-to-right length than that of the other of said parts of said one envelope portion to provide a closure end flap foldable over said other part for closing said one envelope portion whereby said one envelope portion is usable to mail an element therein, said mailing address means, said return address means, and said perforation lines being so relatively disposed that said one envelope portion, after it is separated from the other of said envelope portions and said flap is folded over said other part, includes said return address means for mailing said one envelope portion and is at least essentially free of said mailing address means.

3. The envelope of claim 2 wherein said one part of said one envelope portion is a part of said back panel, and said mailing address means is so disposed on said front panel that said closure end flap covers a portion of said mailing address means when folded over said other part of said one envelope portion to close said one envelope portion.

4. The envelope of claim 3 wherein said back side further includes a main closure flap integrally connected to said front panel at said upper edge for closing the envelope, and said closure end flap of said one envelope portion includes a portion of said main closure flap.

5. The envelope of claim 2 or 3 wherein both of said front and back sides are free of an address window.

6. The envelope of claim 2 wherein said closure end flap includes a portion of said back panel and extends rightwardly of the right edge of said other part of said one envelope portion a predetermined distance, and information data means on the interior surface of said closure end flap and readable upon opening the envelope while facing said front side.

7. The envelope of claim 2 or 1 wherein a portion of said mailing address means is disposed on each of said separable left and right envelope portions, and said flap substantially covers the portion of said mailing address means on said one envelope portion when said end flap is folded over said other part of said one envelope portion to close said one envelope portion for mailing.

8. The envelope of claim 7 said return address means is on the exterior of said back panel and positioned thereon so as to be on said one envelope portion and constitute the mailing address for said one envelope portion.

9. The envelope of claim 2 or 1 wherein said flap has adhesive means thereon and is adapted to be folded over and onto said other part of said left envelope portion, and at least a portion of said address means being located so that it is substantially covered by said flap.

10. A mailing envelope comprising a front side including a front panel adapted to receive postage means at the upper right corner thereof, mailing address means on the exterior side of said front panel for mailing said envelope, second address means on the exterior of said envelope, and a back side connected in facing relation to said front side and including a back panel, each of said sides being free of an address window, a first tear line of perforations extending between the lower and upper edges of said front side, a second tear line of perforations extending between the lower and upper edges of said back side and disposed closer to the right edge of the envelope when viewing said front side than said first line of perforations, said lines of perforations dividing the envelope into left and right envelope portions which are separable at said lines of perforations to open the envelope upon applying a force tending to pull said envelope portions apart; said left envelope portion when separated from said right envelope portion having a right closure flap including a portion of said back panel for closing the left envelope portion so that the left envelope portion can contain an element for mailing, said left and right envelope portions remaining together and said front and back sides being connected together at the left and right edges of said envelope when said envelope is mailed, said mailing address means being so disposed on said front panel that said closure flap covers at least a portion of said mailing address means when folded back for closing said left envelope portion, said second address means being located on said one panel such that it is on said left envelope portion for mailing the same.

11. The envelope of claim 10 wherein said second address means is on the envelope exterior of said part of said back panel of said left envelope portion whereby said second address means becomes the mailing address of said left envelope portion when said part of said back panel of said left envelope portion is used as the front panel for said left envelope portion.

12. The envelope of claim 10 wherein said second address means is oriented to be readable when the envelope is rotated 180° about the longer axis thereof from the position wherein said mailing address is readable.

13. The envelope of claim 10 wherein said front and back panels are adhesively connected together by adhesive means between facing marginal surfaces, and said melting address means is disposed on said front panel so that a portion thereof is on both said right and left envelope portions.

14. The envelope of claim 2 or 10 further including an element to be mailed disposed between said front and back sides and extends across at least one of said lines of perforations and into both of said left and right envelope portions.

15. The envelope of claim 2 or 10 wherein said mailing address means includes ink or the like printing directly on the outer surface of said front panel.

16. The envelope of claim 2, 3, or 10 wherein said front panel includes a main closure flap integrally connected thereto and foldable over said back panel for closing the envelope.

* * * * *

UNITED STATES PATENT AND TRADEMARK OFFICE
CERTIFICATE OF CORRECTION

PATENT NO. : 4,334,618

DATED : June 15, 1982

INVENTOR(S) : Eugene J. Buescher

It is certified that error appears in the above—identified patent and that said Letters Patent is hereby corrected as shown below:

On the title page the following should be added.

-- [*] Notice  The term of this patent subsequent to Feb. 26, 1997, has been disclaimed. --.

Column 2, line 23, delete "delated and substitute -- deleted --.

Column 8, line 33, delete "and" after "FIG.".

Column 9, line 2, delete "both"

Column 9, line 60, delete "which".

Column 14, line 1, delete "one panel" and substitute -- envelope--.

Column 14, line 17, delete "melting" and substitute -- mailing --.

Column 14, line 22, insert "which" after "and".

Signed and Sealed this

Twenty-second Day of February 1983

[SEAL]

Attest:

GERALD J. MOSSINGHOFF

Attesting Officer     Commissioner of Patents and Trademarks